US008856213B2

(12) United States Patent
Moore et al.

(10) Patent No.: US 8,856,213 B2
(45) Date of Patent: Oct. 7, 2014

(54) PROVISIONING A MODERATED DATA SERVICE USING A SYNDICATED RADIO ACCESS NETWORK (RAN)

(75) Inventors: Devin C. Moore, Lewis Center, OH (US); Wade Peebles Thompson, Moore, SC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 243 days.

(21) Appl. No.: 13/207,549

(22) Filed: Aug. 11, 2011

(65) Prior Publication Data
US 2013/0041932 A1   Feb. 14, 2013

(51) Int. Cl.
| | |
|---|---|
| G06F 15/16 | (2006.01) |
| H04L 12/823 | (2013.01) |
| H04W 40/24 | (2009.01) |
| H04L 12/879 | (2013.01) |
| G06F 9/50 | (2006.01) |
| H04L 1/08 | (2006.01) |
| H04W 4/00 | (2009.01) |
| H04W 76/02 | (2009.01) |
| H04L 12/801 | (2013.01) |
| H04L 12/851 | (2013.01) |
| H04L 12/861 | (2013.01) |
| H04L 12/883 | (2013.01) |
| H04W 28/06 | (2009.01) |

(52) U.S. Cl.
CPC ............... *H04L 47/32* (2013.01); *H04W 40/24* (2013.01); *H04L 47/10* (2013.01); *H04L 47/2441* (2013.01); *H04L 49/901* (2013.01); *H04L 49/90* (2013.01); *G06F 9/5055* (2013.01); *H04L 1/08* (2013.01); *H04L 49/9021* (2013.01); *H04W 4/00* (2013.01); *H04L 47/2408* (2013.01); *H04W 76/025* (2013.01); *H04W 28/06* (2013.01); *H04L 47/24* (2013.01)
USPC ........... 709/203; 370/389; 370/412; 370/428; 370/235; 370/394; 717/177; 455/524; 348/14.01; 348/E7.007

(58) Field of Classification Search
USPC ........ 709/203; 370/389, 412, 394; 348/14.01, 348/E7.007; 717/177; 455/524
See application file for complete search history.

(56) References Cited

U.S. PATENT DOCUMENTS

| | | | | |
|---|---|---|---|---|
| 7,746,781 | B1 * | 6/2010 | Xiang | 370/235 |
| 7,948,976 | B2 * | 5/2011 | Arad et al. | 370/389 |
| 2007/0253411 | A1 * | 11/2007 | Arad et al. | 370/389 |
| 2008/0072220 | A1 * | 3/2008 | Saffre et al. | 717/177 |
| 2008/0309748 | A1 * | 12/2008 | Franceschini et al. | 348/14.01 |

* cited by examiner

*Primary Examiner* — Kyung H Shin

(57) ABSTRACT

A system is configured to receive, from a content provider, traffic associated with a data service and that is destined for a group of user devices; retrieve service information, associated with the data service, that includes a value, associated with the data service, that represents a level of service quality associated with the data service; determine whether the traffic is authorized to be transmitted to the user devices based on the value; discard the traffic based on a determination that the value is less than a threshold; process the traffic to identify whether a condition is associated with the traffic based on a determination that the value is not less than the threshold; transmit the traffic to one or more of the user devices based on a determination that the traffic is not associated with a condition; and discard the traffic based on a determination that the traffic is associated with a condition.

22 Claims, 7 Drawing Sheets

| SERVICE ID 405 | PROVIDER ID 410 |
|---|---|
| SUBSCRIBERS 415 | BANDWIDTH 420 |
| LAST UPDATE 425 | OUTAGE 430 |
| DUPLICATE 435 | CONDITION 440 |
| RATINGS 445 | SCORE 450 |
| RANK 455 | ... |

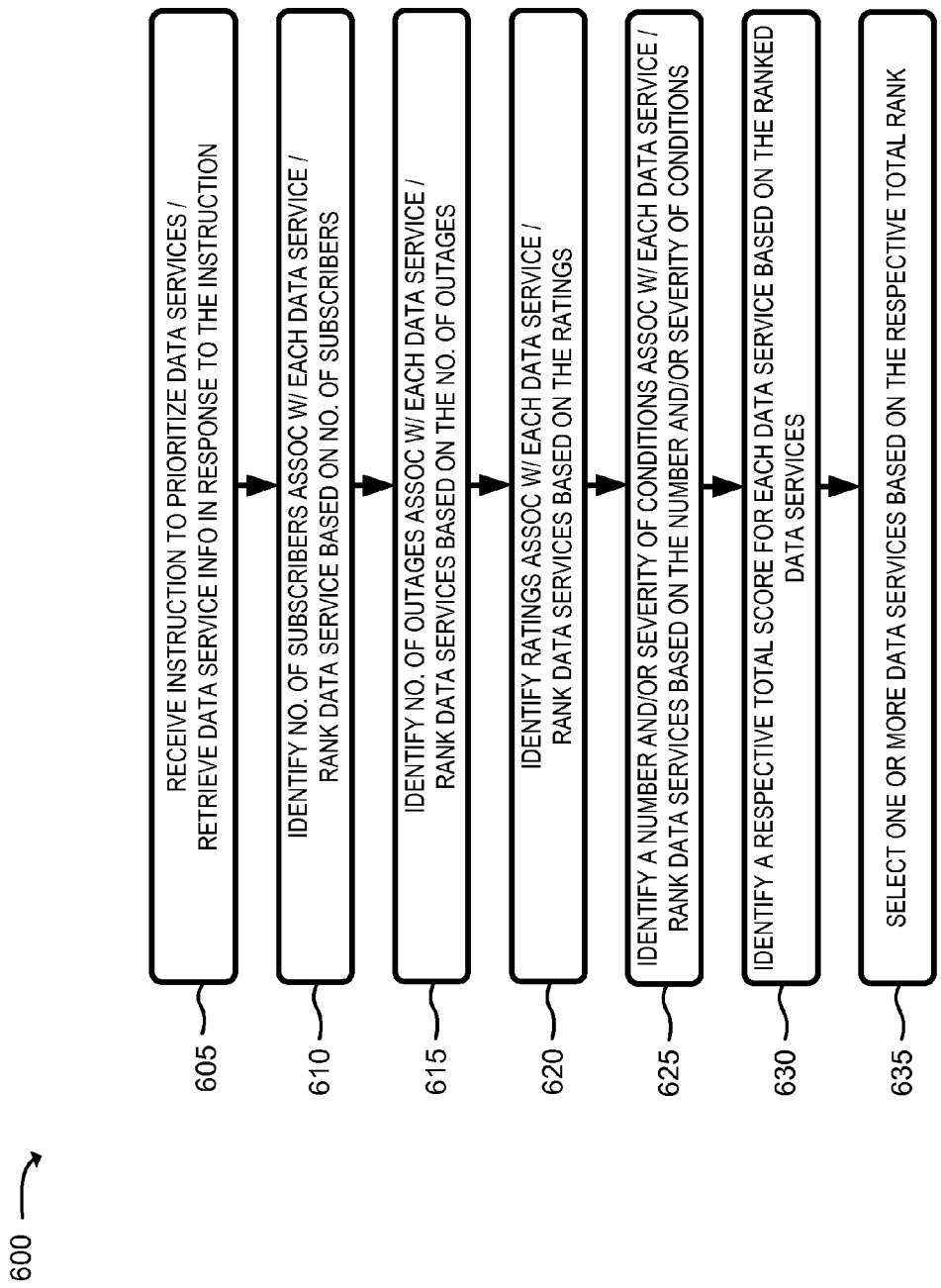

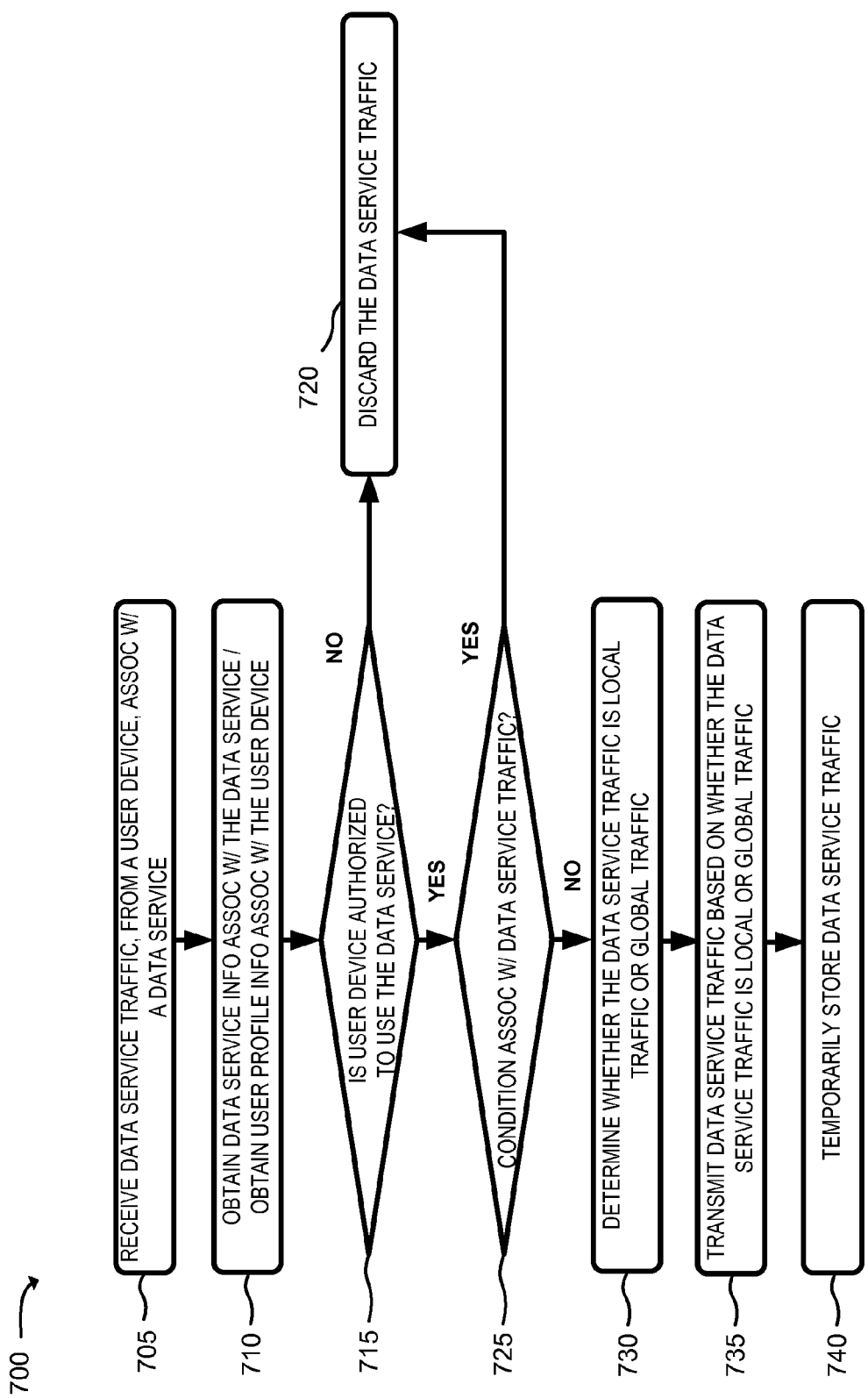

US 8,856,213 B2

1

PROVISIONING A MODERATED DATA SERVICE USING A SYNDICATED RADIO ACCESS NETWORK (RAN)

BACKGROUND

Content providers provide content, to user devices, using data services (e.g., such as really simple syndication (RSS) data feeds) to which the user devices have subscribed. The content is transmitted, to the user devices and via various networks (e.g., service provider networks, the Internet, proprietary networks, etc.), using the data services, which allow the user devices to receive the content in standardized formats. The standardized formats can be used by a variety of applications and/or displayed by a variety of different types of user devices, which enables users, of the user devices, to view the content.

Many data services, however, provide content that is not kept up-to-date by content providers and/or is updated too often (e.g., resulting in duplicate content). Many data services may also be unreliable (e.g., when a data service suffers from an outage, becomes unavailable, fails to provide updated content, etc.). Receiving the content that is not kept up-to-date, is updated too often, and/or is unreliable may cause the user, of the user devices, to have a poor experience when using data services to which the users have subscribed. Additionally, the various networks over which the content is transmitted may waste network resources (e.g., when duplicated and/or out-of-date content is transmitted using the data services).

BRIEF DESCRIPTION OF THE DRAWINGS

FIG. 4 is a diagram of an example data structure for storing service information associated with data service traffic;

FIG. 6 is a flowchart of an example process for identifying data services to be provisioned, via an LTE network of FIG. 1, according to an implementation described herein; and FIG. 7 is a flowchart of an example process for provisioning upstream data service traffic to one or more user devices, according to an implementation described herein.

DETAILED DESCRIPTION OF PREFERRED EMBODIMENTS

The following detailed description refers to the accompanying drawings. The same reference numbers in different drawings may identify the same or similar elements.

A system and/or method, described herein, may enable service information, associated with one or more data services (e.g., such as a really simple syndication (RSS) data service, an atom data service, or a resource description framework (RDF) data service), to be generated based on information associated with traffic that is received based on the data services (hereinafter referred to as "data service traffic"). The service information may identify levels of service quality, associated with the data services, based on a measure of data service availability, an indication of duplicate data service traffic, an indication of a data service outage, a condition associated with data service traffic (e.g., dropped and/or misordered packets, etc.), etc. The system and/or method may use the service information to assign scores to the data services and/or to rank the data services based on the assigned scores. The system and/or method may allow a data service, associated with a score that is greater than a threshold and/or that is ranked above another data service, to be authorized to be provisioned to one or more user devices.

The system and/or method may allow data service traffic to be moderated and/or provisioned to one or more user devices using service information associated with one or more data services. The system and/or method may, for example, allow data service traffic, received from a user device and/or a content provider, to be transmitted to another user device based on a determination that service information, associated with the data service, permits the data service traffic to be transmitted to the user device. The system and/or method may allow data service traffic, associated with a public service message (e.g., such as a weather bulletin, a school closing announcement, an Amber alert, etc.), to be transmitted, to one or more user devices within a geographical area and/or associated with a particular base station within the geographical area. The system and/or method may cause the public service message to be transmitted, to the one or user devices, based on a determination that the public service message corresponds to the geographical area.

The system and/or method may allow data service traffic to be temporarily stored to allow a user device to access the data service traffic based on a determination that the data service is not available. The system and/or method may allow data service traffic, that is received from a user device and via a base station, to be transmitted to other user devices, that are served by the base station, without transmitting the traffic to a network.

Figure 1:
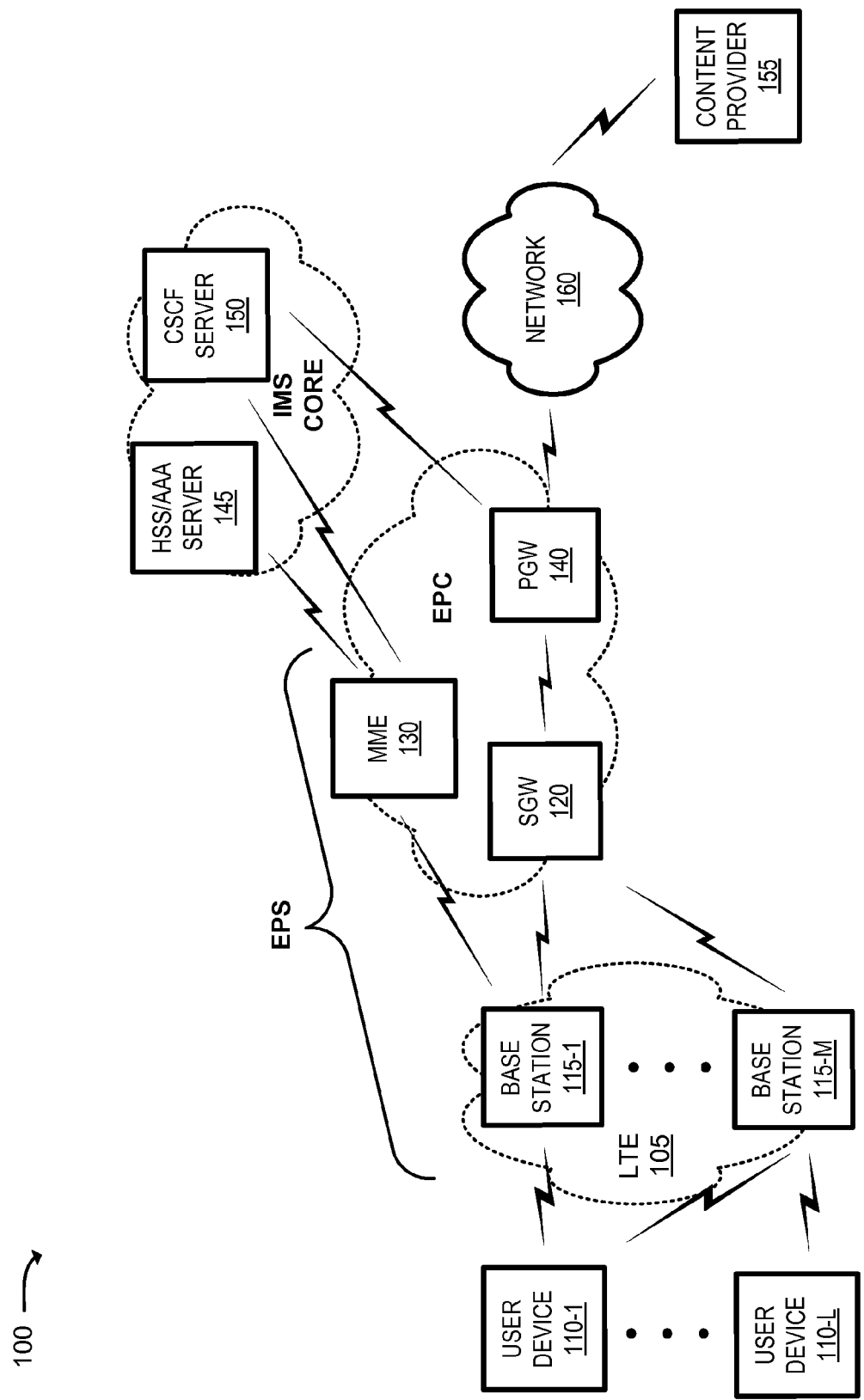
FIG. 1 is a diagram of an example environment in which a system and/or method described herein may be implemented.

FIG. 1 is a diagram of an example environment 100 in which a system and/or method described herein may be implemented. As shown in FIG. 1, environment 100 may include a group of users devices 110-1, . . . , 110-L (where L≥1) (hereinafter referred to collectively as "user devices 110" and individually as "user device 110"), a group of base stations 115-1, . . . , 115-M (where M≥1) (hereinafter referred to collectively as "base stations 115" and individually as "base station 115"), a serving gateway 120 (hereinafter referred to as "SGW 120"), a mobility management entity device 130 (hereinafter referred to as "MME 130"), a packet data network (PDN) gateway (PGW) 140, a home subscriber server (HSS)/authentication, authorization, accounting (AAA) server 145 (hereinafter referred to as an "HSS/AAA server 145"), a call session control function (CSCF) server 150 (hereinafter referred to as "CSCF server 150"), a content provider 155, and a network 160. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Implementations are described as being performed within a radio access network (RAN) that is based on a long term evolution (LTE) network for explanatory purposes. In other implementations, the implementations may be performed within a RAN that is not based on a LTE network.

Environment 100 may include an evolved packet system (EPS) that includes a LTE network 105 and/or an evolved packet core (EPC) that operate based on a third generation partnership project (3GPP) wireless communication standard. LTE 105 may be a RAN that includes one or more base stations 115 that take the form of evolved Node Bs (eNBs) via which user devices 110 communicate with the EPC. The EPC may include SGW 120, MME 130, and/or PGW 140 that enable user devices 110 to communicate with network 160 and/or an Internet protocol (IP) multimedia subsystem (IMS) core. The IMS core may include HSS/AAA server 145 and/or CSCF server 150 and may manage authentication, session initiation, account information, profile information, etc. associated with user devices 110.

User device 110 may include any computation or communication device, such as a wireless mobile communication device that is capable of communicating with base station 115. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a camera, a personal gaming system, or another type of mobile computation or communication device.

Base station 115 may include one or more devices that receive, process, and/or transmit traffic, such as voice, video, text, and/or other data, destined for and/or received from user device 110. In an example implementation, base station 115 may be an eNB associated with LTE network 105 that receives traffic from and/or sends traffic to network 160 via the EPC. Base station 115 may send traffic to and/or receive traffic from user device 110 via an air interface.

In one implementation, one or more of base stations 115 may correspond to a hub base station that performs point-to-multipoint (PMP) communications. For example, base station 115 may communicate with other base stations 115 to transmit data service traffic received from user device 110. In another example, base station 110 may receive data service traffic, from content provider 155, and may transmit the data service traffic to one or more user devices 110 being served by base station 115 and/or that have subscribed to a data service to which the data service traffic corresponds.

SGW 120 may include one or more computation or communication devices that gather, process, search, store, and/or provide information in a manner described herein. SGW 120 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 120 may aggregate traffic received from one or more base stations 115 associated with LTE network 105, and may send the aggregated traffic to network 160 (e.g., via PGW 140) and/or other network devices associated with the IMS core and/or the EPC. SGW 120 may also receive traffic from the other network devices and/or may send the received traffic to user device 110 via base station 115.

MME 130 may include one or more computation or communication devices that gather, process, search, store, and/or provide information in a manner described herein. For example, MME 130 may perform operations associated with handing off user device 110, from a first base station 115 to a second base station 115, when user device 110 is exiting a cell associated with the first base station 115. MME 130 may, in yet another example, perform an operation to handoff user device 110 from the second base station 115 to the first base station 115 when user device 110 is entering the cell associated with the first base station 115.

PGW 140 may include one or more computation or communication devices that gather, process, search, store, and/or provide information in a manner described herein. PGW 140 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, PGW 140 may include a device that aggregates traffic received from one or more SGWs 120, etc. and may send the aggregated traffic to network 160. In another example implementation, PGW 140 may receive traffic from network 160 and may send the traffic toward user device 110 via SGW 120.

HSS/AAA server 145 may include one or more server devices, or other types of computation or communication devices, that gather, process, search, store, and/or provide information in a manner described herein. For example, HSS/AAA server 145 may manage, update, and/or store, in a memory associated with HSS/AAA server 145, profile information associated with user device 110 that identifies applications and/or services that are permitted for and/or accessible by user device 110, information associated with a user of user device 110 (e.g., a username, a password, a personal identification number (PIN), etc.), rate information, minutes allowed, and/or other information. Additionally, or alternatively, HSS/AAA server 145 may include a device that performs authentication, authorization, and/or accounting (AAA) operations associated with a communication session with user device 110.

CSCF server 150 may include one or more server devices, or other types of computation or communication devices, that gather, process, search, store, and/or provide information in a manner described herein. CSCF server 150 may process and/or route calls to and from user device 110 via the EPC. For example, CSCF server 150 may process calls, received from network 160, that are destined for user device 110. In another example, CSCF server 150 may process calls, received from user device 110, that are destined for network 160.

Content provider 155 may include any type, quantity, or form of content provider. For example, content provider 155 may include a free television broadcast provider (e.g., local broadcast providers, such as NBC, CBS, ABC, and/or Fox), a for-pay television broadcast provider (e.g., TNT, ESPN, HBO, Cinemax, CNN, etc.), and/or an Internet-based content provider (e.g., Youtube, Vimeo, Netflix, Hulu, Veoh, etc.) that streams content from websites and/or permits content to be downloaded (e.g., via progressive download, etc.). Content providers 155 may produce a media stream (e.g., a television broadcast). A media stream may refer to a stream of content that includes video content (e.g., a video stream), audio content (e.g., an audio stream), and/or textual content (e.g., a textual stream). In one example implementation, content provider 155 may transmit content, as data service traffic, using a data service (e.g., such as a RSS service, an atom service, a RDF service, etc.).

Network 160 may include one or more wired and/or wireless networks. For example, network 160 may include a cellular network, a public land mobile network (PLMN), a second generation (2G) network, a third generation (3G) network, a fourth generation (4G) network, a fifth generation (5G) network, and/or another network. Additionally, or alternatively, network 160 may include a wide area network (WAN), a metropolitan network (MAN), an ad hoc network, an intranet, the Internet, a fiber optic-based network (e.g., a FiOS network), and/or a combination of these or other types of networks. Network 160 may include nodes 110 via which traffic is transported to and/or from the EPS (e.g., via PGW 140) and/or another network.

Figure 2:
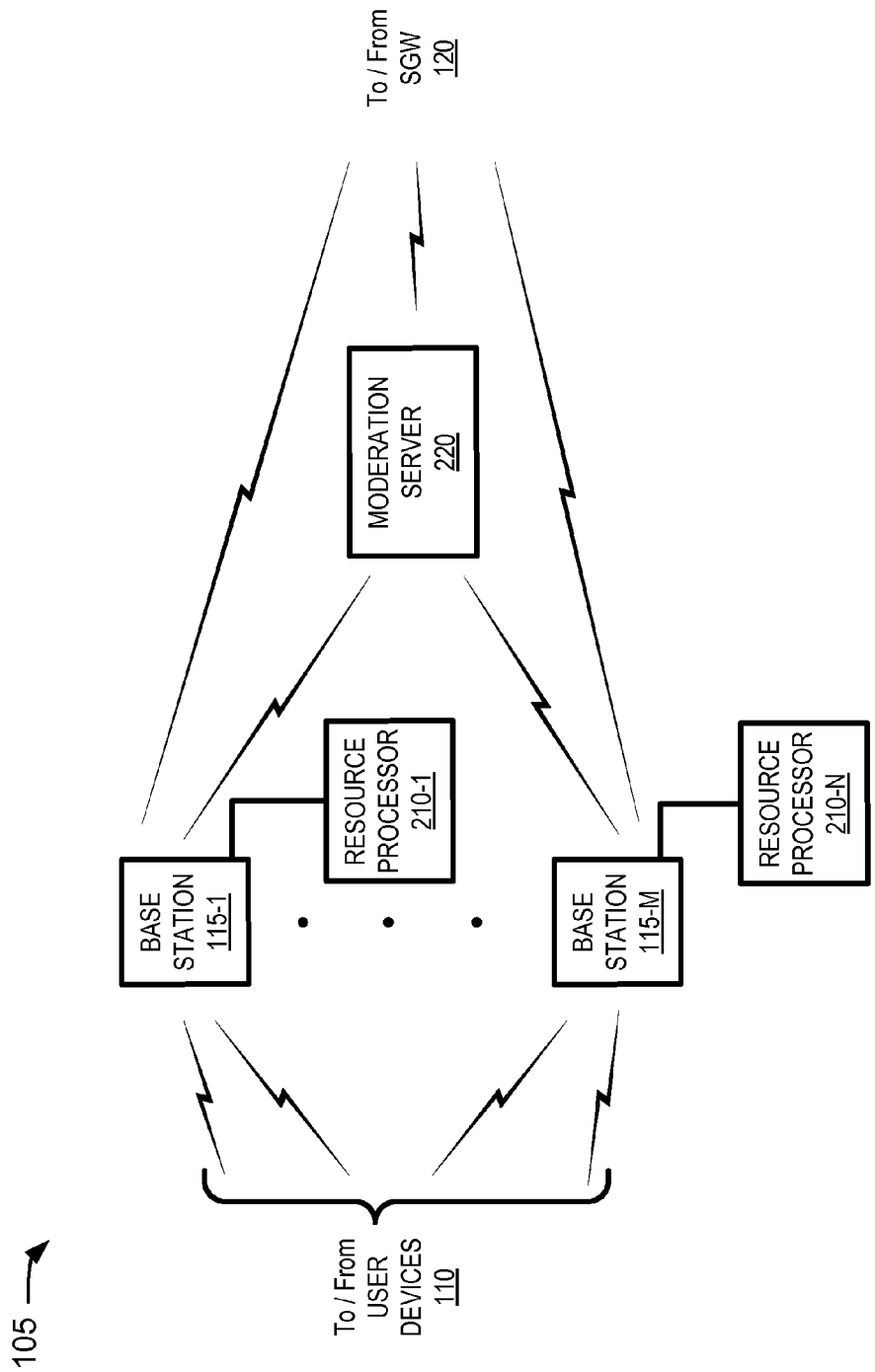
FIG. 2 is a diagram of a long term evolution (LTE) network within the environment of FIG. 1.

FIG. 2 is a diagram of LTE network 105 within environment 100. As shown in FIG. 2, LTE network 105 may include base stations 115, as well as a group of resource processors 210-1, . . . , 210-N (where N≥1) (hereinafter referred to collectively as "resource processors 210" and individually as "resource processor 210"), and a moderation server 220. The number of devices, illustrated in FIG. 2, is provided for explanatory purposes only. In practice, there may be additional devices, fewer devices, different devices, or differently arranged devices than illustrated in FIG. 2.

Resource processor 210 may include one or more server devices, or other types of computation or communication devices, that gather, process, search, store, and/or provide information in a manner described herein. Resource processor 210 may, in one example implementation, be connected to base station 115. Resource processor 210 and/or base station 115 may, in another example implementation, be integrated into a single device. For example, base station 115 may perform one or more, or all, of the functions described below as being performed by resource processor 210.

Resource processor 210 may cause base station 115 to obtain service information, associated data service traffic, received from content provider 155 and/or user device 110. The service information may, for example, identify a data service associated with the data service traffic, a particular content provider 155 from which the data service traffic was received, a quantity of user devices 110 that are receiving the data service traffic, a bandwidth associated with the data service traffic, etc. The service information may, also, or alternatively, identify a time at which the data service traffic is received, a version associated with the data service traffic, whether the data service traffic is a public service message, etc. Also, or alternatively, the service information may identify whether a condition is associated with the data service traffic, whether the data service traffic has not been received, and/or whether the data service traffic is a duplicate of data service traffic that was previously received. Resource processor 210 may save the service information in a memory associated with resource processor 210 and/or may transmit the service information to moderation server 220.

Resource processor 210 may identify whether data service traffic, received from user device 110, is local traffic (e.g., destined for other user devices 110 that are served by base station 115) and/or global traffic (e.g., that is destined for network 160). For example, resource processor 210 may determine that the data service traffic is local traffic, based on an indication obtained from the data service traffic and/or from a user profile associated with a user of user device 110. Based on the determination that the data service traffic is local traffic, resource processor 210 may instruct base station 115 to transmit the data service traffic to user devices 110 being serviced by base station 115 and that have subscribed to the data service. In another example, resource processor 210 may determine that the data service traffic is global traffic. Based on a determination that the data service traffic is global traffic, resource processor 210 may instruct base station 115 to transmit the data service traffic to network 160 via SGW 120 and/or moderation server 220. Resource processor 210 may temporarily store, in a memory associated with resource processor 210, a copy of the data service traffic that allows user device 110 to access the data service traffic when a data service, with which the data service traffic is associated, is not available.

Moderation server 220 may include one or more server devices, or other types of computation or communication devices, that gather, process, search, store, and/or provide information in a manner described herein. Moderation server 220 may integrated into base station 115 and/or resource processor 210. Moderation server 220 may, in one example implementation, perform traffic moderation and/or aggregation operations on data service traffic received from base stations 115 and/or content provider 155. Additionally, or alternatively, moderation server 220 may act as a gateway device that allows other user devices 110 to subscribe to and/or receive data service traffic, via network 160 (e.g., the Internet), that is being processed and/or stored by moderation server 220. Additionally, or alternatively, moderation server 220 may perform one or more, or all, of the functions described above as being performed by resource processor 210.

Moderation server 220 may receive, from content provider 155, data service traffic and may, in a manner similar to that described above, obtain service information from the data service traffic. In another example, moderation server 220 may obtain service information from one or more, or all, of base stations 115.

Moderation server 220 may receive data service traffic, from content provider 155, and may determine whether the data service traffic is to be processed based on service information that corresponds to a data service with which the data service traffic is associated. Moderation server 220 may, in one example, determine whether a score, assigned to the data service, is greater than threshold and/or whether the data service is ranked above another threshold. The assigned score and/or ranking may indicate a level of service quality associated with the data service. The level of service quality may correspond to a quantity of times that the data service has been unavailable or has failed to provided updated data service traffic, a quantity of conditions, associated with the data service, that have been detected, a quantity of times duplicate data service traffic has been received, etc.

Moderation server 220 may transmit the data service traffic, to base stations 115, based on a determination that the score is greater than the threshold and/or that the data service is ranked above the other threshold. Moderation server 220 may, in another example, ignore, discard, or otherwise not transmit the data service traffic, based on a determination that the score is not greater than the threshold and/or that the data service is not ranked above the other threshold.

Moderation server 220 may determine that the data service traffic is duplicate data service traffic when the data service traffic matches other data service traffic that is stored in the memory. Moderation server 220 may ignore, discard, or otherwise not transmit the data service traffic, to base station 115, based on a determination that the data service traffic is duplicate data service traffic. By ignoring, discarding, and/or otherwise not transmitting the duplicate data service traffic, moderation server 220 may reduce bandwidth resource utilization and/or improve an experience of a user of user device 110.

Moderation server 220 may identify that a condition, such as jitter, dropped packets, mis-ordered packets, delayed packets, malicious software (e.g., virus, spyware, etc.), an electronic attack (e.g., a denial of service attack (e.g., packet flooding, etc.), bandwidth that is greater than a threshold, etc.) is associated with the data service traffic. Moderation server 220 may ignore, discard, or otherwise not transmit the data service traffic, to base station 115, based on a determination that the condition is associated with the data service traffic. Accordingly, moderation server 220 may protect user devices 110, base station 115, and/or other devices, associated with the EPC and/or IMS core, from being damaged, losing data, and/or experiencing a service disruption.

Moderation server 220 may receive data service traffic associated with a public service message (e.g., an emergency alert, a weather bulletin, an Amber alert, etc.) associated with a geographical area. Moderation server 220 may transmit the data service traffic to user devices 110 being serviced by a base station 115 located within the geographical area and/or within a particular distance of the geographical area. Accordingly, moderation server 220 may transmit a public service message, as data service traffic, to user devices 110 associated with the geographic area.

Figure 3:
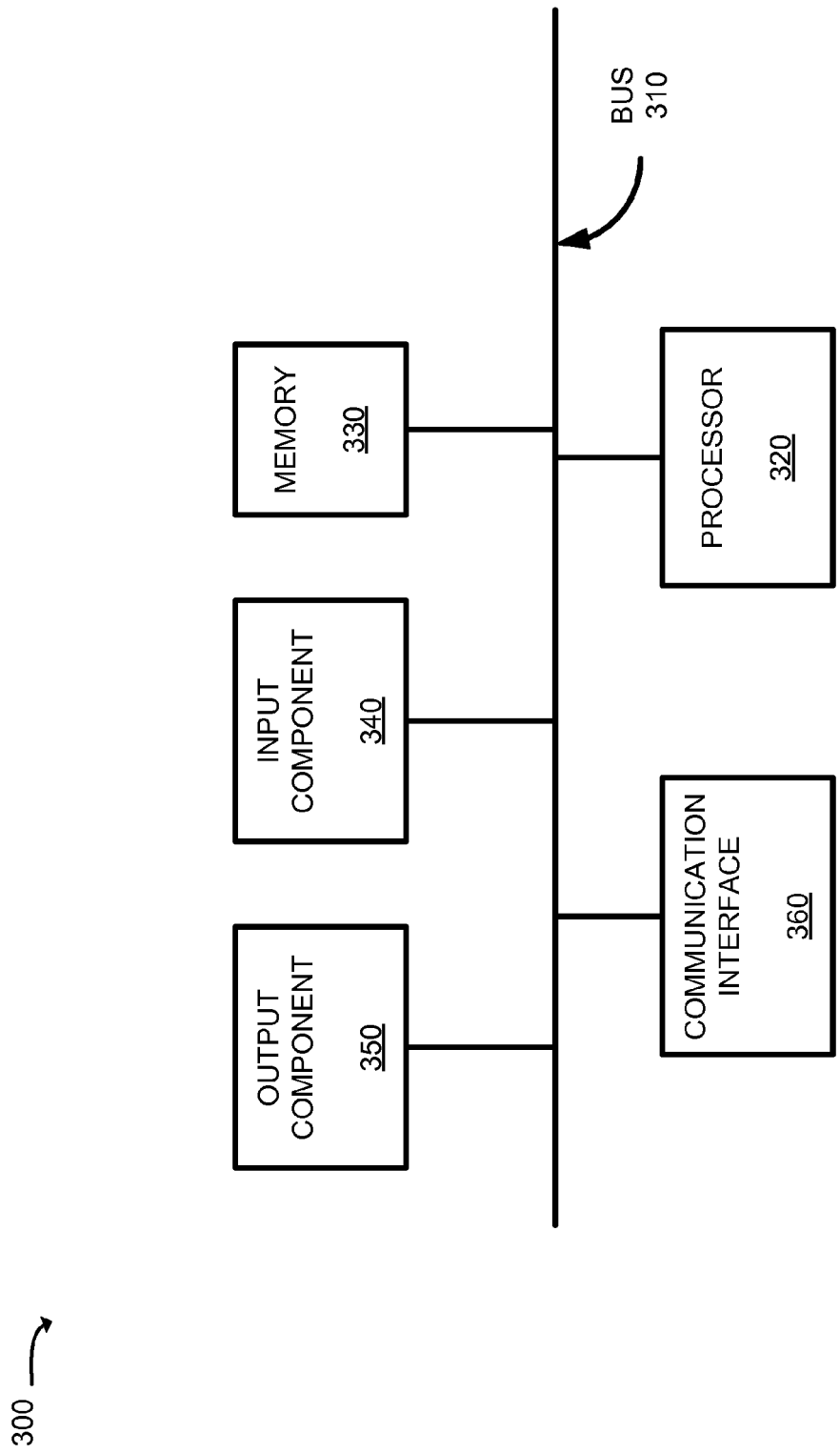
FIG. 3 is a diagram of example components of one or more of the devices of FIGS. 1 and/or 2.

FIG. 3 is a diagram of example components of a device 300. Device 300 may correspond to user device 110, SGW 120, MME 130, PGW 140, HSS/AAA server 145, CSCF server 150, resource processor 210, and/or moderation server 220. Alternatively, or additionally, each of user device 110, SGW 120, MME 130, PGW 140, HSS/AAA server 145, CSCF server 150, resource processor 210, and/or moderation server 220 may include one or more devices 300 and/or one or more of each of the components of device 300.

Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path, or a set of paths, that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as network 185. In one alternative implementation, communication interface 360 may be a logical component that includes input and output ports, input and output systems, and/or other input and output components that facilitate the transmission of data to other devices.

As will be described in detail below, device 300 may perform certain operations relating to moderating and/or provisioning data service traffic. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 4 is a diagram of an example data structure 400 for storing service information associated with data service traffic. As illustrated in FIG. 4, data structure 400 may store a collection of fields, such as a service identifier (ID) field 405, a provider ID field 410, a subscribers field 415, a bandwidth field 420, a last update field 425, an outage field 430, a duplicate field 435, a condition field 440, a ratings field 445, a score field 450, and a rank field 455. Data structure 400 includes fields 405-455 for explanatory purposes. In practice, data structure 400 may include additional fields, fewer fields, different fields, and/or differently arranged fields than are described with respect to data structure 400.

Service ID field 405 may store information that uniquely identifies a particular data service (e.g., such as a data service identifier, a data service name, etc.) associated with data service traffic received by moderation server 220 and/or base station 115. Provider ID field 410 may store information that identifies a particular content provider 155 (e.g., such as a device identifier, a network address, etc.) that provides the particular data service and/or with which the data service traffic is associated. Subscribers field 415 may store information associated with each user device 110 that has subscribed to the particular data service. The information associated with user device 110 may include a device identifier (e.g., a mobile directory number (MDN), a landline directory number (LDN), an international mobile subscriber identifier (IMSI), etc.), a network address (e.g., an IP address, a media access control (MAC) address, etc.), and/or information associated with a user, of user device 110 (e.g., a username, password, personal identification number (PIN), etc.). Subscribers field 415 may also, or alternatively, identify a quantity of user devices 110 that have subscribed to the particular data service.

Bandwidth field 420 may store information that identifies a quantity of bandwidth associated the particular data service. For example, moderation server 220 and/or base station 115 may receive data service traffic and may store information associated with a quantity of bandwidth associated with the data service traffic. In another example, moderation server 220 may store information that identifies a quantity of bandwidth that is expected to be associated with the data service traffic based on quantities of bandwidth associated with previous data service traffic. Last update field 425 may identify a previous time at which data service traffic, associated with the particular data service, was received, by moderation server 220 and/or base station 115, relative to a scheduled time and/or time interval. Additionally, or alternatively, moderation server 220 may store a quantity of times that the data service traffic is received late (e.g., when the data service traffic is received after the scheduled time etc.). Outage 430 may store information that identifies whether the particular data service is unavailable. For example, moderation server 220 may not receive the particular data service traffic at a time when the data service traffic is scheduled to be received and may store an indication that the particular data service is unavailable and/or has experienced an outage. Additionally, or alternatively, outage field 430 may identify a quantity of outages, associated with the particular data service, within a period of time.

Duplicate field 435 may store information that identifies whether data service traffic is duplicate traffic. For example, moderation server 220 may store an indication that the data service traffic is duplicate traffic when the data service traffic matches data service traffic that was previously received by and/or is stored in a memory associated with moderation server 220 and/or resource processor 210. Additionally, or alternatively, duplicate field 435 may identify a quantity of times that duplicate data service traffic has been received within the period of time. Condition field 440 may store information that identifies whether a condition is associated with the data service traffic. For example, moderation server 220 and/or base station 115 may store an indication that a condition is associated with the data service traffic based on a determination that a quantity of dropped, mis-ordered, and/or delayed packets is greater than a threshold, when malicious software and/or an electronic attack is detected, etc. Additionally, or alternatively, condition field may identify a quantity of times that a condition, associated with the data service traffic, has previously been detected within the period of time.

Ratings field 445 may store information associated with ratings obtained from users of other user devices 110. The ratings may identify a popularity and/or a sentiment (e.g. like, dislike, neither like nor dislike, etc.) among the users of user devices 110 that have received and/or subscribed to a data service. For example, moderation server 220 may obtain information associated with the ratings (e.g., associated with the particular data service), from the other user devices 110 and may store the information associated with the ratings. In another example, moderation server 220 may obtain the information, associated with the ratings, from content provider 155 and/or from a web server (e.g., via the Internet) that enables access to the information associated with the ratings.

Score field 450 may store a value that has been assigned to the particular data service that represents a level of service quality associated with the particular data service. For example, moderation server 220 may, in a manner described in greater detail below with respect to FIG. 5, generate the value based on a quantity of user devices 110 that have subscribed to the particular data service (e.g., as identified by subscribers field 415), a quantity of times that the data service traffic is received late (e.g., as identified by last update field 425), a quantity of outages associated with the particular data service (e.g., as identified by outage field 430), a quantity of duplicate data service traffic associated with the particular data service (e.g., as identified by duplicate field 435), a quantity of conditions associated with the particular data service (e.g., as identified by condition field 440), ratings associated with the particular data service (e.g., as identified by ratings field 445), etc.

Rank field 455 may identify a rank, that corresponds to the particular data service, based on the value that has been assigned to the particular data service as identified in score field 450. The rank may, for example, be based on the assigned value relative to other values that have been assigned, by moderation server 220, to other data services.

Figure 5:
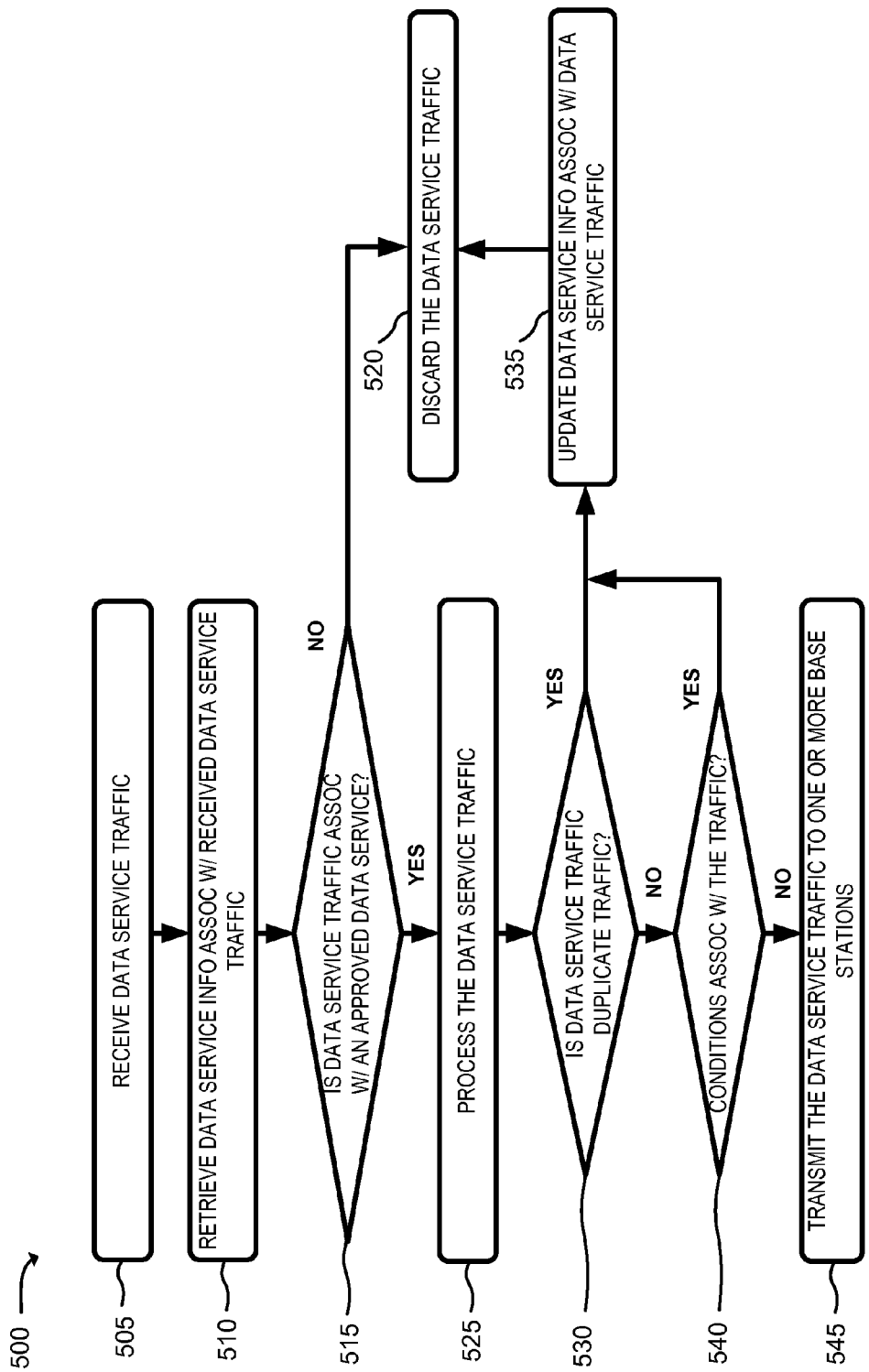
FIG. 5 is a flowchart of an example process for provisioning downstream data service traffic to one or more user devices, according to an implementation described herein.

FIG. 5 is a flowchart of an example process 500 for provisioning downstream data service traffic to one or more user devices 110, according to an implementation described herein. In one example implementation, process 500 may be performed by moderation server 220. In another example implementation, some or all of process 500 may be performed by a device or collection of devices separate from, or in combination with moderation server 220.

As shown in FIG. 5, process 500 may include receiving data service traffic (block 505) and retrieving service information associated with the data service traffic (block 510). For example, moderation server 220 may receive data service traffic, from content provider 155 and via SGW 120 and/or PGW 140, and may identify, with which data service the data service traffic is associated. Moderation server 220 may retrieve, from a memory associated with moderation server 220, service information associated with the data service traffic and/or the identified data service.

As also shown in FIG. 5, if the data service traffic is not associated with an approved data service (block 515—NO), then process 500 may include discarding the data service traffic (block 520). For example, moderation server 220 may determine whether the received data service traffic includes an indication that the identified data service is an approved data service. The indication that the data service is an approved data service may allow moderation server 220 to process the data service traffic and/or transmit the data service traffic to user devices 110 and/or base stations 120. Moderation server 220 may, for example, determine that the data service traffic is not associated with an approved data service based on a determination that the service information does not include the indication that the identified data service is an approved data service. In another example, moderation server 220 may obtain, from the service information, a value that was assigned to the identified data service in a manner similar to that described above with respect to FIG. 4. Moderation server 220 may determine whether the value is greater than a first threshold. Based on a determination that the value is not greater than the first threshold, moderation server 220 may determine that the data service is not an approved data service. In yet another example, moderation server 220 may determine whether the identified data service is ranked, in a manner similar to that described above with respect to FIG. 4, above a quantity of other data services that corresponds to a second threshold. Based on a determination that the identified data service is not ranked above the quantity of other data services, moderation server 220 may determine that the data service is not an approved data service. In a further example, moderation server 220 may determine whether content provider 155, from which the data service traffic was received, is identified on a list of approved content providers. Based on a determination that content provider 155 is not identified on the list of approved content providers, moderation server 220 may determine that the data service is not an approved data service.

Moderation server 220 may discard the data service traffic, may ignore the data service traffic, and/or may otherwise not transmit the data service traffic to base station 115 and/or user device 110 based on the determination that the data service is not an approved data service.

As further shown in FIG. 5, if the data service traffic is associated with an approved data service (block 515—YES), then process 500 may include processing the data service traffic (block 525). For example, moderation server 220 may determine that the data service traffic is associated with an approved data service based on a determination that the service information includes the indication that the identified data service is an approved data service. In another example, moderation server 220 may determine that the value, assigned to the identified data service, is greater than the first threshold.

Based on the determination that the value is greater than the first threshold, moderation server 220 may determine that the data service is an approved data service. In yet another example, moderation server 220 may determine that the identified data service is ranked above the quantity of other data services that corresponds to the second threshold. Based on the determination that the identified data service is ranked above the quantity of other data services, moderation server 220 may determine that the data service is an approved data service. In a further example, moderation server 220 may determine that content provider 155 is identified on the list of approved content providers. Based on the determination that content provider 155 is identified on the list of approved content providers, moderation server 220 may determine that the data service is an approved data service.

Based on the determination that the data service traffic is associated with an approved data service, moderation server 220 may process the data service traffic. For example, moderation server 220 may identify a quantity of bandwidth and/or a data rate associated with the received data service traffic. Moderation server 220 may identify a time at which the received data service traffic was received. Additionally, or alternatively, Moderation server 220 may analyze packets, associated with the data service traffic, to determine whether a condition is associated with the data service traffic and/or whether the data service traffic is duplicate traffic.

As yet further shown in FIG. 5, if the data service traffic is duplicate traffic (block 530—YES), then process 500 may include updating service information associated with the data service traffic (block 535). For example, moderation server 220 may determine whether the data service traffic is duplicate traffic. Moderation server 220 may, for example, compare the received data service traffic to other data service traffic, associated with the identified data service, that is stored in the memory. Moderation server 220 may determine that the received data service traffic is duplicate traffic based on a determination that the received data service traffic matches other data service traffic, associated with the data service, stored in a memory associated with moderation server 220.

Moderation server 220 may update the service information based on the determination that the data service traffic is duplicate traffic. For example, moderation server 220 may store an indication that the data service traffic is duplicate traffic in the memory. Moderation server 220 may, also, or alternatively, increment a quantity of times that duplicate traffic has been associated with the data service and may store the incremented quantity of times in the memory. Moderation server 220 may, also, or alternatively, store all or a portion of other service information in the memory, such as the quantity of bandwidth associated with the data service traffic, a time at which the data service traffic was received, etc. Moderation server 220 may, in a manner similar to that described above with respect to block 520, discard, ignore, and/or otherwise not transmit the data service traffic, to base station 115 and/or user device 110, based on the determination that the data service traffic is duplicate traffic.

As still further shown in FIG. 5, if the data service traffic is not duplicate traffic (block 530—NO), and if a condition is associated with the data service traffic (block 540—YES), then process 500 may include updating service information associated with the data service traffic (block 535). For example, moderation server 220 may determine that the data service traffic is not duplicate traffic based on a determination that the received data service traffic does not match other data service traffic, associated with the data service, stored in a memory associated with moderation server 220.

Moderation server 220 may determine whether a condition is associated with the data service traffic. Moderation server 220 may, for example, process the data service traffic to determine whether a quantity of dropped, mis-ordered, and/or delayed packets is greater than a third threshold. Based on a determination that the quantity of dropped, mis-ordered, and/or delayed packets is greater than the third threshold, moderation server 220 may determine that a condition is associated with the data service traffic. Moderation server 220 may determine that a condition is associated with the data service traffic when malicious software (e.g., virus, spyware, etc.) is detected, an electronic attack (e.g., a denial of service attack, packet flooding, etc.) is detected, and/or a severity of jitter that is greater than a fourth threshold, is detected.

Moderation server 220 may, also, or alternatively, determine whether a quantity of bandwidth, associated with the data service traffic, is greater than a fifth threshold. Based on a determination that the quantity of bandwidth is greater than the fifth threshold, moderation server 220 may determine that a condition is associated with the data service traffic. In a further example, moderation server 220 may determine that a condition is associated with the data service traffic when content, associated with the data service traffic, does not conform to a particular format. The particular format may specify one or more types of authorized image formats, one or more types of authorized text formats, a maximum quantity of data (e.g., bits, bytes, etc.) permitted within a message, a maximum quantity of uniform resource locators (URLs) that are permitted within a block of data (e.g., such as a webpage, a message, etc.), etc.

Moderation server 220 may update the service information based on the determination that the data service traffic is associated with a condition. For example, moderation server 220 may store, in the memory, an indication that the data service traffic is associated with a condition. The indication may describe a type of condition that was identified by moderation server 220. Moderation server 220 may also, or alternatively, increment a quantity of times that a condition has been identified with respect to data service traffic associated with the data service and may store the incremented quantity of times in the memory. Moderation server 220 may also, or alternatively, store all or a portion of other service information in the memory, such as the quantity of bandwidth associated with the data service traffic, a time at which the data service traffic was received, etc. Moderation server 220 may, in a manner similar to that described above with respect to block 520, discard, ignore, and/or otherwise not transmit the data service traffic, to base station 115 and/or user device 110, based on the determination that the data service traffic is associated with a condition.

As also shown in FIG. 5, if a condition is not associated with the data service traffic (block 540—NO), then process 500 may include transmitting the data service traffic to one or more base stations (block 545). For example, moderation server 220 may determine whether a condition is associated with the data service traffic. Moderation server 220 may, for example, determine that the quantity of dropped, mis-ordered, and/or delayed packets is not greater than the third threshold. Based on the determination that the quantity of dropped, mis-ordered, and/or delayed packets is not greater than the third threshold, moderation server 220 may determine that a condition is not associated with the data service traffic. Moderation server 220 may determine that a condition is not associated with the data service traffic when malicious software, an electronic attack, and/or jitter, that is associated with a level of severity that is greater than the fourth threshold, is not detected.

Moderation server 220 may, also, or alternatively, determine that a quantity of bandwidth, associated with the data service traffic, is not greater than the fifth threshold. Based on the determination that the quantity of bandwidth is not greater than the fifth threshold, moderation server 220 may determine that a condition is not associated with the data service traffic. Additionally, or alternatively, moderation server 220 may determine that a condition is not associated with the data service traffic when content, associated with the data service traffic, conforms to the particular format. Based on the determination that a condition is not associated with the data service traffic, moderation server 220 may transmit the data service traffic to base station 115. Base station 115 may receive the data service traffic and may transmit the data service traffic to one or more user devices 110 that are served by base station 115. Resource processor 210 may temporarily store the data service traffic in a memory associated with resource processor 210.

FIG. 6 is a flowchart of an example process 600 for identifying data services to be provisioned, via LTE network 105, according to an implementation described herein. In one example implementation, process 600 may be performed by moderation server 220. In another example implementation, some or all of process 600 may be performed by a device or collection of devices separate from, or in combination with moderation server 220.

As shown in FIG. 6, process 600 may include receiving an instruction to prioritize data services and retrieving service information in response to the instruction (block 605). For example, moderation server 220 may receive an instruction to prioritize data services to determine which data services are to be provisioned within LTE 105. The instruction may be received based on a time interval (e.g., every one minute, thirty minutes, one hour, twelve hours, etc.), at a time of day (e.g., at midnight each day, etc.), after an occurrence of some event (e.g., when service data traffic is received, a condition is detected, etc.), etc. Moderation server 220 may retrieve, from a memory associated with moderation server 220, service information (e.g., such as service information stored in data structure 400 of FIG. 4) associated with one or more services that have been received and/or processed by moderation server 220 and/or resource processor 210.

As also shown in FIG. 6, process 600 may include identifying a number of subscribers associated with each data service and ranking the data services based on the number of subscribers (block 610). For example, moderation server 220 may identify a quantity of user devices 110 that have subscribed to each data service based on the service information. Moderation server 220 may rank the data services based on the respective quantity of user devices 110 that have subscribed to each of the data services. Moderation server 220 may assign a different subscriber value (e.g., $V_S$) to each data service based on how the data services are ranked. For example, a first subscriber value, that is greater than any other subscriber values assigned to other data services, may be assigned to a first data service associated with a greatest quantity of user devices 110 that have subscribed to the data service. In another example, a second subscriber value, that is less than any other subscriber values assigned to other data services, may be assigned to a second data service associated with a least quantity of user devices 110 that have subscribed to the second data service.

As further shown in FIG. 6, process 600 may include identifying a number of outages associated with each data service and ranking the data services based on the number of outages (block 615). Moderation server 220 may rank the data services based on a respective quantity of outages (e.g., obtained from the service information) associated with each of the data services. Moderation server 220 may assign a different outage value (e.g., $V_O$) to each data service based on how the data services are ranked. For example, a first outage value, that is greater than all other outage values assigned to other data services, may be assigned to a first data service associated with a least quantity of outages relative to other data services. In another example, a second outage value, that is less than all other outage values assigned to other data services, may be assigned to a second data service associated with a greatest quantity of outages relative to the other data services.

As yet further shown in FIG. 6, process 600 may include identifying ratings associated with each data service and ranking the data services based on the ratings (block 620). Moderation server 220 may rank the data services based on respective ratings (e.g., obtained from the service information), associated with each of the data services. Moderation server 220 may assign a different rating value (e.g., $V_R$) to each data service based on how the data services are ranked. For example, a first rating value, that is greater than all other rating values assigned to other data services, may be assigned to a first data service associated with a rating that is higher than ratings associated with other data services. In another example, a second rating value, that is less than all other rating values assigned to other data services, may be assigned to a second data service associated with a rating that is lower than ratings associated with other data services.

As still further shown in FIG. 6, process 600 may include identifying a number and/or severity of conditions associated with each data service and ranking the data services based on the number and/or severity of conditions (block 625). Moderation server 220 may rank the data services based on a respective quantity of conditions and/or a respective measure of severity of conditions (e.g., obtained from the service information) associated with each of the data services. Moderation server 220 may assign a different condition value (e.g., $V_C$) to each data service based on how the data services are ranked. For example, a first condition value, that is greater than all other condition values assigned to other data services, may be assigned to a first data service associated with a least quantity of conditions and/or a lowest measure of severity of conditions relative to other data services. In another example, a second condition value, that is less than all other condition values assigned to other data services, may be assigned to a second data service associated with a greatest quantity of conditions and/or a highest measure of severity relative to the other data services.

As also shown in FIG. 6, process 600 may include identifying a respective total score for each data service based on the ranked data services (block 630). For example, moderation server 220 may identify a respective total value (e.g., $V_T$) for each data service based on the respective subscriber values (e.g., $V_S$), outage values (e.g., $V_O$), ratings values (e.g., $V_R$), and/or condition values (e.g., $V_C$). In one example, a total value, for a data service, may correspond to a sum of the subscriber value, outage value, ratings value and/or condition value associated with the data service (e.g., where $V_T = V_S + V_O + V_R + V_C$).

In another example, the total value may correspond to a weighted sum of the subscriber value, outage value, ratings value and/or condition value associated with the data service. The weighted sum may be based on weighting factors (e.g. W) associated with the subscriber value (e.g., $W_S$, where $W_S$ is a subscriber weighting factor), outage value (e.g., $W_O$, where $W_O$ is the outage weighting factor), ratings value (e.g., $W_R$, where $W_R$ is the ratings weighting factor), and/or condition value (e.g., $W_C$, where $W_C$ is the outage condition factor). The weighting factors may be predetermined by moderation server 220 and/or an operator of moderation server 220 that allows a relative portion of each of the values (e.g., $V_S$, $V_O$, $V_R$, and $V_C$) to be adjusted using the weighting factors (e.g., where $W_S+W_O+W_R+W_C \leq 1$). In this example, the total value, associated with a data service, may be based on a sum of the subscriber value modified by the subscriber weighting factor (e.g., $W_S*V_S$), the outage value modified by the outage weighting factor (e.g., $W_O*V_O$), the ratings value modified by the ratings weighting factor (e.g., $W_R*V_R$), and/or the condition value modified by the condition weighting factor (e.g., $W_C*V_C$) (e.g., $V_T=W_S*V_S+W_O*V_O+W_R*V_R+W_C*V_C$). In yet other examples, moderation server 220 may identify the total value, for the data service, based on an average of the assigned values (e.g., $V_T=(V_S+V_O+V_R+V_C)/4$), a weighted average of the assigned values (e.g., $V_T=(W_S*V_S+W_O*V_O+W_R*V_R+W_C*V_C)/4$) and/or some other mathematical function. Moderation server 220 may identify a total value for each of the data services in a manner similar to that described above.

As further shown in FIG. 6, process 600 may include selecting one or more data services based on the respective total rank scores associated with the data services (block 635). For example, moderation server 220 may select one or more data services associated with total values that are greater than a threshold. Moderation server 220 may authorize data service traffic, associated with the selected data services, to be provisioned, by base station 115, to user device 110. In another example, moderation server 220 may rank the data services based on the total values associated with the data services. Moderation server 220 may select one or more data services based on the rankings (e.g., top 10, top 50, top 100, etc.). Moderation server 220 may authorize data service traffic, associated with the selected data services, to be provisioned, by base station 115, to user device 110.

FIG. 7 is a flowchart of an example process 700 for provisioning upstream data service traffic to one or more user devices 110, according to an implementation described herein. In one example implementation, process 700 may be performed by resource processor 210. In another example implementation, some or all of process 700 may be performed by a device or collection of devices separate from, or in combination with, resource processor 210.

As shown in FIG. 7, process 700 may include receiving data service traffic, from a user device, associated with a data service (block 705) and retrieving service information associated with the data service and/or user profile information associated with the user device 110 (block 710). For example, resource processor 210 may receive data service traffic, from user device 110 and via base station 115, and may identify, with which data service the data service traffic is associated.

Resource processor 210 may retrieve, from a memory associated with resource processor 210, service information (e.g., service information associated with data structure 400 of FIG. 4) associated with the data service. Resource processor 210 may also retrieve, from HSS/AAA server 145, user profile information associated with user device 110. The user profile information may identify to which data services user device 110, or a user associated with user device 110, has subscribed.

As also shown in FIG. 7, if the user device is not authorized to use the data service (block 715—NO), the process 700 may include discarding the data service traffic (block 720). For example, resource processor 210 may use the user profile information to determine whether user device 110 is authorized to use the data service to transmit the data service traffic.

Resource processor 210 may determine that the user profile information does not include an indication that user device 110 has subscribed to the data service and/or is otherwise authorized to use the data service. Based on a determination that the user profile information does not include the indication that user device 110 has subscribed to the data service and/or is otherwise authorized to use the data service, resource processor 210 may ignore the data service traffic, discard the data service traffic, or otherwise not transmit the data service traffic to a destination device.

Resource processor 210 may, in a manner similar to that described above with respect to block 515 of FIG. 5, use the service information to determine whether the data service is authorized to be provisioned to other user devices 110. Resource processor 210 may, for example, determine that the service information does not include an indication that the data service is an approved data service. In another example, resource processor 210 may obtain, from the service information, a value (e.g., a total score), associated with a level of service quality, that was assigned to the data service in a manner similar to that described above with respect to block 630 of FIG. 6. Based on a determination that the value is not greater than a threshold, resource processor 210 may determine that the data service is not an approved data service. Based on a determination that the data service is not an approved data service, resource processor 210 may ignore the data service traffic, discard the data service traffic, or otherwise not transmit the data service traffic to a destination device.

As further shown in FIG. 7, if the user device is authorized to use the data service (block 715—YES) and if a condition is associated with the traffic (block 725—YES), then process 700 may include discarding the data service traffic (block 720). For example, resource processor 210 may determine that the user profile information includes the indication that user device 110 has subscribed to the data service and/or is otherwise authorized to use the data service. Resource processor 210 may also, or alternatively, determine that the service information includes an indication that the data service is an approved data service. In another example, if resource processor 210 determines that the value (e.g., the total score), obtained from the service information, is greater than the threshold, resource processor 210 may determine that the data service is an approved data service. Based on a determination that the user profile information authorizes user device 110 to use the data service and/or that the data service is an approved data service, resource processor 210 may process the data service traffic to determine whether a condition is associated with the data service traffic and/or to identify to which destination device to transmit the data service traffic.

For example, resource processor 210 may process the data service traffic, in a manner similar to that described above with respect to block 525 of FIG. 5, to determine that a quantity of dropped, mis-ordered, and/or delayed packets are greater than the third threshold. In another example, resource processor 210 may determine that a condition is associated with the data service traffic when malicious software is detected, an electronic attack is detected, and/or a severity of jitter, that is greater than a fourth threshold, is detected. In yet another example, resource processor 210 may determine that a condition is associated with the data service traffic based on a determination that a quantity of bandwidth, associated with the data service traffic, is greater than a fifth threshold. In a further example, resource processor 210 may determine that a condition is associated with the data service traffic when content, associated with the data service traffic, does not conform to the particular format (e.g., a format associated with one or more types of authorized image formats, one or more authorized text formats, a maximum quantity of data permitted within a message, a maximum quantity of URLs that are permitted within a message, etc.), etc.

Resource processor 210 may update the service information based on the determination that the data service traffic is associated with a condition. For example, resource processor may, in a manner similar to that described above with respect to block 535 of FIG. 5, store, in a memory associated with resource processor 210, an indication that the data service traffic is associated with a condition. The indication may identify a level of severity associated with the condition. Resource processor 210 may, in another example, increment a quantity of times that a condition has been identified with respect to the data service and may store the incremented quantity of times in the memory. Resource processor 210 may, in yet another example, store all or a portion of other service information, associated with the data service, in the memory, such as the quantity of bandwidth associated with the data service traffic, a time at which the data service traffic was received, etc.

Resource processor 210 may transmit the updated service information to moderation server 220. Moderation server 220 may receive the updated service information and may store the updated service information in a memory associated with moderation server 220. Moderation server 220 and/or resource processor 210 may also transmit the updated service information to other resource processors 210. Resource processor 210 may discard, ignore, and/or otherwise not transmit the data service traffic, based on the determination that the data service traffic is associated with a condition.

As yet further shown in FIG. 7, if a condition is not associated with the data service traffic (block 725—NO), then process 700 may include determining whether the data service traffic is local traffic or global traffic (block 730). For example, resource processor 210 may determine that the quantity of dropped, mis-ordered, and/or delayed packets are not greater than the third threshold. Additionally, or alternatively, resource processor 210 may determine that a condition is not associated with the data service traffic when malicious software is not detected, an electronic attack is not detected, and/or a severity of jitter that is greater than the fourth threshold, is not detected. Additionally, or alternatively, resource processor 210 may determine that a condition is not associated with the data service traffic based on a determination that the quantity of bandwidth is not greater than the fifth threshold. Additionally, or alternatively, resource processor 210 may determine that a condition is not associated with the data service traffic when the content, associated with the data service traffic, conforms to the particular format.

Resource processor 210 may determine whether the data service traffic is local traffic and/or global traffic. For example, resource processor 210 may determine whether the data service traffic includes a first indication that the data service traffic is to be processed as local traffic (e.g., to be transmitted to user device 110 via base station 115 and not via network 160). In one example, the data service traffic, to be processed as the local traffic, may be associated with a public service message (e.g., an emergency alert, a weather bulletin, an Amber alert, etc.) associated with a geographical area. In another example, resource processor 210 may determine whether the data service traffic includes a second indication that the traffic is to be processed as global traffic (e.g., to be transmitted to network 160). In one example, the data service traffic, that is to be processed as global traffic, may be associated with a message posted to a blog, a social networking website, etc. that is hosted by a web server via the Internet (e.g., network 160). In yet another example, resource processor 210 may determine whether the data service traffic includes the first indication and the second indication that the traffic is to be processed as both local traffic and global traffic.

As also shown in FIG. 7, process 700 may include transmitting data service traffic based on whether the data service traffic is local traffic or global traffic (block 735) and temporarily storing the data service traffic (block 740). For example, resource processor 210 may determine that the data service traffic includes the first indication and may transmit the data service traffic to all or a portion of user devices 110 being served by base station 115. In one example, resource processor 210 may communicate with HSS/AAA server 145 to identify which of the user devices 110 have subscribed to the data service. Resource processor 210 may transmit the data service traffic to a portion of user devices 110 that are identified as having subscribed to the data service. In another example, resource processor 210 may determine that the local data service traffic is associated with a public service message and may transmit the local data service traffic to all of user devices 110 being serviced by base station 110. In yet another example, the data service traffic, associated with the public service message, may identify a geographical area (e.g., an area corresponding to a county, zip code, city, etc.) to which the public service message corresponds. Resource processor 210 may transmit the data service traffic to other base stations 115 within the geographical area and/or that include cells that cover a portion of the geographical area. Other base stations 115 may transmit the data service traffic to other user devices 110 being served by the other base stations 115 and/or that are identified as being located within the geographical area.

In another example, resource processor 210 may determine that the data service traffic includes the second indication and may transmit the data service traffic to moderation server 220 that allows the data service traffic to be transmitted to network 160 (e.g., via SGW 120 and/or PGW 140). In yet another example, resource processor 210 may determine that the data service traffic includes the first and second indications. Resource processor 210 may, in a manner similar to that described above, transmit the data service traffic to all or the portion of user devices 110 (e.g. that are served by base station 115) and/or to other base stations 115 (e.g., based on a geographical area) based on the determination that the data service traffic includes the first indication. Resource processor 210 may also, in a manner similar to that described above, transmit the data service traffic to moderation server 220 based on the determination that the data service traffic includes the second indication.

Resource processor 210 may temporarily store a copy of the data service traffic in a memory associated with resource processor 210. Resource processor 210 may also transmit a copy of the data service traffic to moderation server 220 that allows moderation server 220 to temporarily store the data service traffic in another memory associated with moderation server 220. Resource processor 210 and/or moderation server 220 may transmit the data service traffic to another base station 115 that allows the other base station 115 to temporarily store the data service traffic in a further memory associated with the other base station 115 and/or another resource processor 210 associated with the other base station 115. Temporarily storing the data service traffic in resource processor 210, the other resource processor 210, and/or moderation server 220 may allow the data service traffic to be obtained, by one or more base stations 115 and/or one or more user devices 110 in the event that an outage is associated with the data service with which the data service traffic is associated.

A system and/or method, described herein, may enable service information to be generated based on data service traffic that is received from a content provider and/or user device. The system and/or method may use the service information to assign scores to the data services and/or to rank the data services based on the assigned scores. The system and/or method may allow a data service, associated with a score that is greater than a threshold and/or that is ranked above another data service, to be authorized to be provisioned to one or more user devices.

The system and/or method may allow data service traffic to be moderated and/or provisioned to one or more user devices using service information. The system and/or method may, for example, allow data service traffic, received from a user device and/or content provider, to be transmitted to another user device based on a determination that service information, associated with the data service, permits the data service traffic to be transmitted to the user device. The system and/or method may allow data service traffic, associated with a public service message (e.g., such as a weather bulletin, a school closing announcement, an Amber alert, etc.), to be transmitted, to one or more user devices within a geographical area and/or associated with a particular base station within the geographical area. The system and/or method may cause the public service message to be transmitted, to the one or more user devices, based on a determination that the public service message corresponds to the geographical area.

The system and/or method may allow data service traffic to be temporarily stored to allow a user device to access the data service traffic based on a determination that the data service is not available. The system and/or method may allow data service traffic, that is received from a user device and via a base station, to be transmitted to other user devices, that are served by the base station, without transmitting the traffic to a network.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with regard to FIGS. 5-7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a server device and from a content provider, traffic associated with a data service and that is destined for a plurality of user devices;
retrieving, from a memory associated with the server device, service information, associated with the data service, where the service information includes a value, associated with the data service, that represents a level of service quality associated with the data service;
determining, by the server device, that the data service is an approved data service in response to determining that the value associated with the data service is equal to or above a threshold;
discarding, by the server device, the traffic in response to determining that the value is less than the threshold;
processing, by the server device, the traffic to identify whether a condition is associated with the traffic based on the determination that the data service is an approved data service;
transmitting the traffic to one or more of the plurality of user devices based on a determination that the traffic is not associated with the condition; and
discarding, by the server device, the traffic based on a determination that the traffic is associated with the condition.

2. The method of claim 1, where the service information includes the value associated with the data service and at least one of:
an expected quantity of bandwidth relating to traffic associated with the data service, where the expected quantity of bandwidth is based on traffic, associated with the data service, that was received during a period of time that precedes the receipt of the traffic,
an indication of a prior time when other traffic, associated with the data service, was received,
an indication of a quantity of times that the data service has been unavailable during the period of time,
an indication of a quantity of times duplicate traffic, associated with the data service, has been received during the period of time, or
an indication of a quantity of times that the condition has been detected, with respect to traffic associated with the data service, during the period of time.

3. The method of claim 1, further comprising:
temporarily storing the traffic based on the determination that the value is equal to or above the threshold, where temporarily storing the traffic allows a user device, of the plurality of user devices, to access the traffic when the data service is unavailable.

4. The method of claim 1, where processing the traffic further includes:
   determining whether a quantity of bandwidth, associated with the traffic, is greater than a bandwidth threshold; and
   determining that the condition is associated with the traffic when the quantity of bandwidth, associated with the traffic, is greater than the bandwidth threshold.

5. The method of claim 4, further comprising:
   identifying, from the service information, a quantity of times that the condition has been associated with the data service;
   incrementing the quantity of times that the condition has been associated with the data service based on the determination that the condition is associated with the traffic; and
   storing, in the memory, the incremented quantity of times that the condition has been associated with the data service.

6. The method of claim 1, further comprising:
   comparing the traffic with other traffic that is stored in another memory associated with the server device;
   identifying the traffic as duplicate traffic when the traffic matches the other traffic that is stored in the other memory; and
   discarding the traffic based on the identification of the traffic as duplicate traffic.

7. The method of claim 6, further comprising:
   identifying, based on the service information, a quantity of times that duplicate traffic has been associated with the data service;
   incrementing the quantity of times that duplicate traffic has been associated with the data service based on the identification that the traffic is duplicate traffic; and
   storing, in the memory, the incremented quantity of times that duplicate traffic has been associated with the data service.

8. The method of claim 1, where transmitting the traffic to the one or more of the plurality of user devices further includes:
   transmitting the traffic to one or more base stations that serve the one or more of the plurality of user devices, where transmitting the traffic to the one or more base stations:
      allows the one or more base stations to transmit the traffic to the one or more user devices,
      allows each of the one or more base stations to temporarily store the traffic in a respective memory associated with each of the one or more base stations, and
      allows one of the one or more user devices to access the traffic when the data service or the server device are unavailable.

9. The method of claim 1, where processing the traffic to identify whether the condition is associated with the traffic further includes:
   identifying that the condition is associated with the traffic based on a determination that:
      malicious software is associated with the traffic,
      a quantity of dropped or mis-ordered packets, associated with the traffic, is greater than a first threshold, or
      a level of severity of jitter, associated with the traffic, is greater than a second threshold.

10. The method of claim 1, wherein the condition includes one or more of jitter, a particular quantity of dropped packets, a particular quantity of mis-ordered packets, a particular quantity of delayed packets, an indication of malicious software, or an indication of an electronic attack.

11. A server device comprising:
   a memory to store service information that corresponds to a plurality of data services with which traffic, destined for a plurality of user devices, is associated, where the service information identifies levels of service quality associated with the plurality of data services; and
   one or more processors to:
      receive an instruction to identify which of the plurality of data services are authorized to be provisioned to the plurality of user devices,
      one or more of:
         assign a respective first value, to each respective data service of the plurality of data services, based on a respective quantity of times that the service information indicates that a condition, associated with the respective data service, has been detected during a time period,
         assign a respective second value, to each respective data service, based on a respective quantity of times that the service information indicates that the respective data service has been unavailable during the time period,
         assign a respective third value, to each respective data service, based on a respective quantity of user devices, of the plurality of user devices, that have subscribed to the respective data service during the time period, or
         assign a respective fourth value, to each respective data service, based on a respective rating that is associated with the respective data service during the time period, and
      authorize traffic, associated with one or more data services of the plurality of data services, to be provisioned to the plurality of user devices based on the respective first value, the respective second value, the respective third value, or the respective fourth value.

12. The server device of claim 11, where the one or more processors are further to:
   generate a respective total value for each respective data service based on the respective first value, the respective second value, the respective third value, or the respective fourth value, and
   authorize the traffic, associated with one or more data services, to be provisioned to the plurality of user devices based on a determination that the respective total value is greater than a threshold.

13. The server device of claim 12, where, when generating the respective total value for each of the plurality of data services, the one or more processors are further to:
   identify a first weighting factor, associated with the respective first value, and a second weighting factor, associated with the respective second value, and
   generate a total value, associated with the data service, based on a combination of the respective first value and the first weighting factor, and the respective second value the second weighting value.

14. The server device of claim 12, where the one or more processors are further to:
   receive traffic associated with a data service of the plurality of data services,
   identify, based on the service information, whether the data service is an authorized data service,
   transmit the traffic, associated with the data service, to a user device, of the one or more user devices, based on a determination that the data service is an authorized data service, and discard the traffic, associated with the data service, based on a determination that the data service is not an authorized data service.

15. The server device of claim 11, where the service information, associated with one of the plurality of data services, identifies at least one of:
- a quantity of times that the condition, associated with the one of the plurality of data services, has been detected within the time period,
- a quantity of times that duplicate traffic, associated with the one of the plurality of data services, has been detected within the time period,
- a quantity of user devices, of the plurality of user devices, that have subscribed to the one of the plurality of data services within the time period,
- a rating, associated with the one of the plurality of data services, obtained within the time period, or
- a quantity of times that the one of the plurality of data services has not been available to be accessed within the time period.

16. A network device, connected to a base station of a plurality of base stations within a radio access network (RAN), the network device comprising:
a memory to store service information associated with a plurality of data services, where the service information includes a respective value that corresponds to a respective level of service quality associated with each of the plurality of data services; and
one or more processors to:
- receive, from a user device and via the base station, traffic, associated with a data service of the plurality of data services, that is destined for one or more user devices that are served by the base station or a destination device that is not served by the base station,
- determine that the data service is an approved data service in response to determining that the respective value associated with the data service is equal to or above a threshold,
- discard the traffic, associated with the data service, when the respective value, associated with the data service, is less than the threshold,
- identify whether the traffic, associated with the data service, is local traffic or global traffic based on an indication obtained from the traffic and in response to determining that the data service in an approved data service,
- transmit the traffic, via the base station, to at least one of the one or more user devices based on a determination that the traffic is local traffic, and
- transmit the traffic, via the base station, to the destination device outside the RAN based on a determination that the traffic is global traffic.

17. The network device of claim 16, where at least one of the one or more processors is further to:
- receive, from another user device of the one or more user devices, traffic associated with another data service of the plurality of data services,
- retrieve, from a server device, a user profile, associated with another user device, of the one or more user devices, where the user profile indicates whether a user, of the other user device, has subscribed to another data service of the plurality of user devices, and
- discard traffic, associated with the other data service, when the user profile indicates that the user is not subscribed to the other data service.

18. The network device of claim 16, where at least one of the one or more processors is further to:
- identify one or more uniform resource locators (URLs), included within the traffic, and
- discard the traffic based on a determination that a quantity of URLs, of the one or more URLs, is greater than another threshold.

19. The network device of claim 16, where at least one of the one or more processors is further to:
- obtain, from the service information, information that identifies a quantity of conditions, associated with the data service, that have been identified within a period of time,
- increment the quantity of conditions based on the determination that the quantity of URLs is greater than the threshold, and
- update the service information by replacing the quantity of conditions with the incremented quantity of conditions.

20. The network device of claim 16, where at least one of the one of the one or more processors is further to:
- receive, from the user device and via the base station, a request for traffic, associated with another data service of the plurality of data services,
- determine that the traffic, associated with the other data service, is not being received from a content provider,
- retrieve, from the memory, a copy of the traffic associated with the other data service, and
- transmit the traffic, associated with the other data service, to the user device in response to the request.

21. The network device of claim 16, where at least one of the one or more processors is further to:
- send, to a server device, a request for a list of the one or more user devices that have subscribed to the data service based on the determination that the traffic is local traffic, and
- identify the at least one of the one or more user devices that has subscribed to the data service from the list of the one or more user devices that have subscribed to the data service.

22. The network device of claim 16, where at least one of the one or more processors is further to:
- temporarily store the traffic, associated with the data service, in the memory,
- determine, after transmitting the traffic, associated with the data service, that the data service is no longer available,
- retrieve, from the memory, a copy of the traffic, associated with the data service, based on the determination that the data service is no longer available, and
- transmit the copy of the traffic to one or more of the plurality of base stations,
  - where transmitting the copy of the traffic, to the one or more of the plurality of base stations, allows the one or more of the plurality of base stations to provision the copy of the traffic when the data service is no longer available.

* * * * *